United States Patent [19]

Bednarz

[11] Patent Number: 4,993,260
[45] Date of Patent: Feb. 19, 1991

[54] UNIVERSAL EXPANSION CONNECTION AND INTEGRAL LOCK

[76] Inventor: James W. Bednarz, 1025 W. Crosby, Slaton, Tex. 79364

[21] Appl. No.: 368,577

[22] Filed: Jun. 20, 1989

[51] Int. Cl.$^5$ ............................................. G01F 15/18
[52] U.S. Cl. ...................................... 73/201; 285/32; 285/80
[58] Field of Search ................... 73/201, 273; 285/30, 285/32, 80, 90, 302, 355, 298, 404

[56] References Cited

U.S. PATENT DOCUMENTS

| | | | |
|---|---|---|---|
| 584,232 | 6/1897 | McDowell | 285/80 |
| 718,826 | 1/1903 | Dick et al. | 285/80 |
| 1,495,011 | 5/1929 | Ford | 73/201 |

*Primary Examiner*—Herbert Goldstein
*Attorney, Agent, or Firm*—Baker & Botts

[57] ABSTRACT

A universal expansion connection (32) couples a water meter (10) to an outlet pipe (30). The expansion connection (32) comprises a threaded expansion tube (36), a threaded packer (38) and a lock case (40). The threaded packer (38) is threaded onto the expansion tube (36), which has been installed on an outlet (34) on the meter (10). The lock case (40) is then positioned over and onto the packer (38) such that a driver dog (63) on the packer (38) matches a driver dog recess (64) in the case (40). By holding the expansion tube (36) from turning, the lock case (40) is turned to unscrew the threaded packer (38) from the tube (36). The unscrewing action forces the packer (38) into the internal surface (68) of the lock case (40), as well as forcing the threads (58) into the threads (54) on the tube (36). When the lock case (40) has been sufficiently unscrewed, a fluid-tight seal is formed between the meter (10) and the outlet pipe (30). A locking bolt (33) is then inserted through the lock case (40) via a shroud (76). The locking bolt (33) is positioned between a plurality of spaced-apart locking bars (46) on the tube (36) to prevent further rotation thereof.

34 Claims, 3 Drawing Sheets

UNIVERSAL EXPANSION CONNECTION AND INTEGRAL LOCK

TECHNICAL FIELD OF THE INVENTION

This invention relates in general to lockable expansion connections, and in particular to a universal expansion connection and integral lock.

BACKGROUND OF THE INVENTION

Metering devices, such as gas and water meters, are provided by utility companies to measure usage of individual clients for billing purposes. Such meters are sometimes housed in a compression type meter box which is recessed in the surrounding surface. There, the meter is "in line" with the inlet and outlet piping and is somewhat protected from freezing and damage. The meter box has a lid thereon to allow the utility company to obtain a reading from the meter and bill the client accordingly. In some poorer countries, where the climate is temperate, meter yokes may be used for installation rather than a meter box.

The meter is connected on one end to a main feed line. The meter outlet, through the use of an expansion connection, is connected to an infeed line to the client's facility. The expansion connection is provided to install, seal and retain the meter in the meter box such that a fluid can be transported, measured, recorded and delivered therethrough to the individual client's facility. The expansion connection is provided to fill an irregular gap between the meter and a line leading to the individual client's facility. Typically, expansion connections comprise a plurality of interconnecting pieces, including an integral installation and removal handwheel or wrench.

Unfortunately, many unscrupulous individuals have discovered that it is very easy to loosen the expansion connection by hand and reverse the meter, thereby causing the meter totalizing register to run backwards and register or indicate less than the actual consumption. In some cases, the meters may even be removed and sold for scrap metal. Additionally, in the case of unscrupulous individuals, when the utility company desires to discontinue services to the customer's facility for nonpayment or other appropriate reasons, neither the current expansion connections nor a valve fixed in the meter box are adequate to positively lock a client off. In these and other situations, the utility company is frequently cheated of their due revenues, which is not only illegal but is also a burden on honest clients who end up bearing the burden for those who cheat. Basically, if the utility company can prevent the meter from being removed from the meter box, tampering with the meter can be prevented.

A device designed to fit over many of the presently made expansion connections to prevent removal thereof is disclosed in pending U.S. patent application Ser. No. 040,922 to Bednarz, filed Apr. 20, 1987. The Bednarz Ser. No. 040,922 locking device makes the best of poorly designed conventional expansion connections by covering the installation and removal handwheel to prevent loosening of the expansion connection and tampering with the meter. However, typical expansion connections comprise an excessive number of intricately machined, close-fitting parts and are therefore excessively complex and expensive to manufacture. Moreover, because of the damp and dirty environment, the close-fitting parts eventually become corroded and encrusted with mineral deposits, etc., and are difficult if not impossible to operate by hand, as designed.

A pending U.S. patent application Ser. No. 247,955 to Bednarz, filed Sept. 22, 1988, for a Lockable Water Meter Expansion Connection and Method, discloses a simple and relatively inexpensive expansion connection that is not subject to corrosion and is designed to be locked. The '955 expansion connection may be used to install any American Water Works Association (AWWA) approved meter in any compression-type meter box or setter (includes meter boxes, meter yokes, and any other mechanism used to couple a water meter in-line). The Bednarz Ser. No. 247,955 locking device, however, requires interaction with the meter and meter box or setter to make the meter tamper-proof. Thus, there is a need for a universal expansion connection and lock that may be used to install and/or lock any AWWA approved meter in any compression-type meter setter without requiring interface with the meter and the meter box or setter.

SUMMARY OF THE INVENTION

The present invention disclosed herein comprises a method and apparatus for a universal expansion connection and integral lock which eliminates or substantially reduces problems associated with prior expansion connections and their related locking devices. The present invention allows the installation of an improved expansion connection and integral lock between the outlet of a water meter and the infeed to a customer. In accordance with one aspect of the invention, an apparatus connects and locks a first fluid carrier to a second fluid carrier. An expansion tube sealingly engages the first fluid carrier. A threaded packer is threaded onto exterior threads on the tube which is then received within a lock case. A first end of the lock case sealingly engages the tube while a second and of the lock case sealingly engages the second fluid carrier.

In another aspect of the present invention, the expansion tube comprises a first open end for receiving the first fluid carrier. A plurality of spaced apart locking bars engageable with the lock case are positioned on an external circumferential surface of the tube between the first open end and the exterior threads. A seal ring abuts the locking bars distal the threads to prevent debris from entering the lock case and to reduce accessibility to the locking bars from exterior the lock case.

It is a technical advantage of the present invention that an expansion connection and integral lock case can be universally installed on meter outlets. No interaction is required between the meter setter, the meter, or the lock case to insure a tamper resistant connection. The expansion connection and integral lock case comprise a minimum number of parts each of which are relatively simple to manufacture.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE INVENTION

Figure 1:
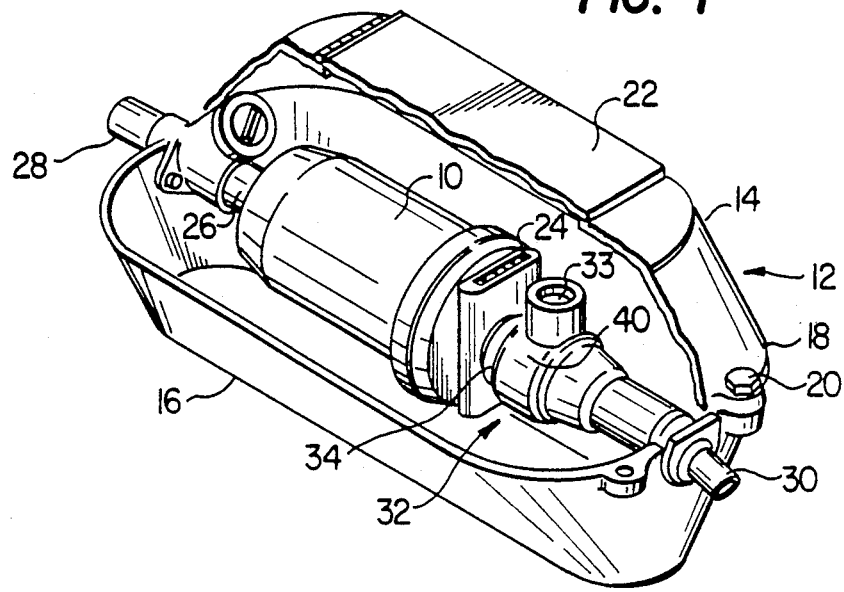
FIG. 1 is a perspective view of a water meter locked in accordance with the present invention.

In FIGS. 1-5, like items are identified by like and corresponding numerals for ease of reference. Referring to FIG. 1, a perspective view of a water meter 10 locked in accordance with the preferred embodiment of the present invention is illustrated. The water meter 10 may be installed within a meter box 12 constructed of a suitable material for recessing in the ground. Although not shown, it is to be understood that the present invention can be used with equal success on any in-line system including a simple C-shaped yoke. The meter box 12 has a top portion 14 and a bottom portion 16 joined together along seams 18 by any appropriate method, such as bolts 20 or welds (not shown). Top portion 14 has a lift-off lid 22 to provide access to the internal portions of the meter box 12 and which is typically opened by a meter reader to check the numbers on a recorder 24 on the water meter 10.

The water meter 10 is a device comprised of an individual billing unit fitted with an inlet pipe 26 connected to a water main 28 and an outlet pipe 30, which serves the client. The meter 10 allows water to pass therethrough and records the volume for future billing purposes. A universal expansion connection, generally identified by the reference numeral 32, is installed between an outlet 34 on the meter 10 and the outlet pipe 30. The connection 32 retains and seals the meter 10 in the meter box 12 and allows water to flow through the individual billing unit into the customer's facility. Although not shown, it is to be understood that butt joints are used to seal inlet pipe 26 to the water main 28 and to seal the expansion connection 32 to the outlet pipe 30.

In accordance with the preferred embodiment of the present invention, the universal expansion connection 32 is placed between the meter outlet 34 and the outlet pipe 30. Upon installation, portions of the universal expansion connection 32 travel away from the meter 10, thereby causing the connection 32 to grow in length and close a gap therebetween, as will be subsequently described in greater detail. The connection 32 is then securely locked in place by the installation of a locking bolt 33 which passes through a lock case 40. The meter box 12 may then be closed and water allowed to flow through the individual billing unit.

Figure 2:
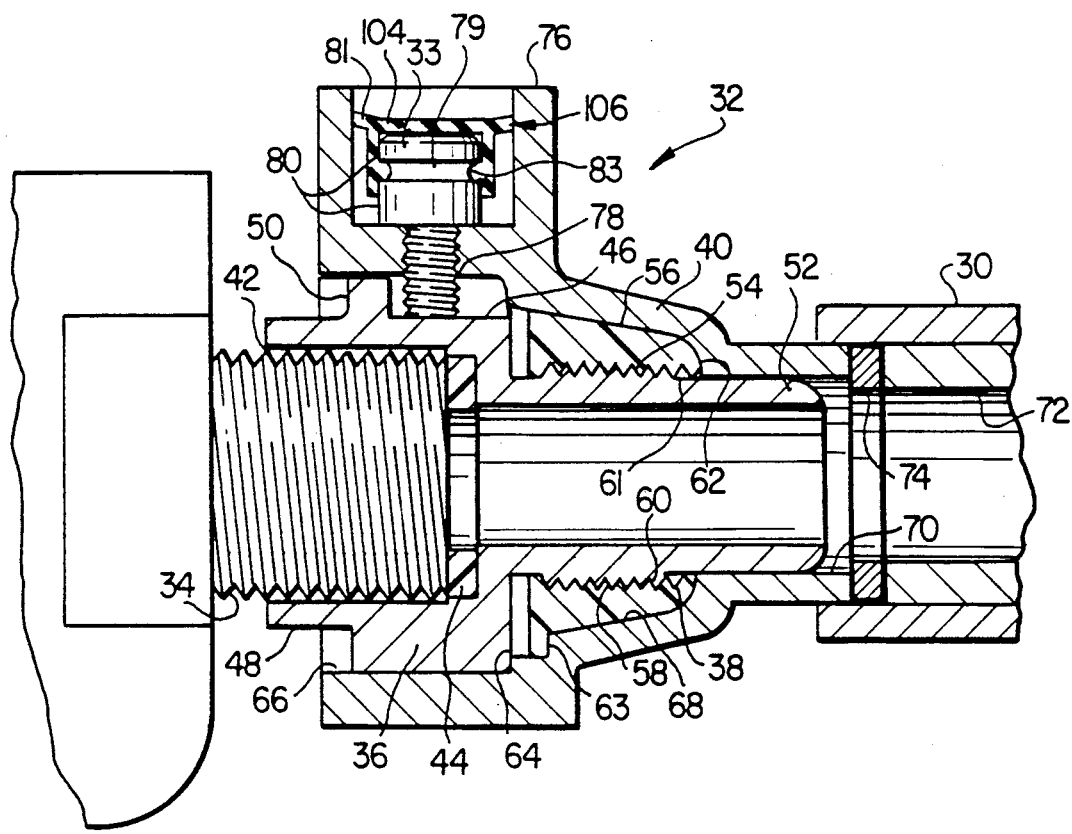
FIG. 2 is a cross-sectional view of the preferred embodiment of the present invention.

Referring to FIG. 2, the universal expansion connection 32 is illustrated in a cross-sectional view. The expansion connection 32 comprises an expansion tube 36, a threaded packer 38 and the lock case 40. The expansion connection 32 is installed between the outlet pipe 30 and the meter outlet 34.

The expansion tube 36 comprises a first open end 42 for receiving the meter outlet 34. A sealing washer 44 is preferably installed between the first open end 42 and the outlet 34 to insure a fluid-tight seal. Although not shown, it is to be understood that first open end 42 may be threaded to match the threaded outlet pipe 34.

It is preferable that first open end 42 is smooth bored to allow radial positioning of the connection 32 on the outlet 34. The locking bolt 33 may then be placed in a "12:00" o'clock or vertical position to facilitate inspection thereof. The smooth bore also makes tampering and unauthorized removal of the connection 32 more difficult because the connection between the meter outlet 34 and the expansion tube 36 is such that any relative rotative motion between the two would not be of any consequence, whereas, if the expansion tube 36 were threaded, a rotative motion between meter 10 and expansion connection 32 would either loosen the threaded connection or over tighten it, thereby placing undue stress on pin 33 and locking bar 46.

The expansion tube 36 has a plurality of spaced-apart locking bars 46 positioned adjacent the first open end 42. The locking bars 46 are oriented in an axial direction around an external circumferential surface of the first open end 42 of the expansion tube 36. A collar 48, having a diameter less than the locking bars 46, is positioned between the locking bars 46 and the first open end 42. A seal ring 50 abuts the locking bars 46 and is positioned between the locking bars 46 and the collar 48 to prevent debris from entering the enlarged open end 66 and to reduce accessibility to the locking bars 46 from tampering devices which may be used to attempt to pry loose the expansion tube 36.

The expansion tube 36 has a second tubular end 52 for engaging the threaded packer 38 and the lock case 40. The second end 52 has external threads 54 formed thereon to matingly engage the threaded packer 38.

The threaded packer 38 comprises a noncompressible, flowable material, such as a polyurethane or a thermoplastic polyester elastomer. The threaded packer 38 has a tapered external surface 56 constructed and arranged to match an internal surface of the lock case 40. Internal threads 58 are formed within the packer 38 to match the external threads 54 on the expansion tube 36.

The packer 38 preferably has a low coefficient of friction to prevent it from seizing on the external threads 54, and allowing the packer 38 to slip deeper into the lock case 40 and deform slightly to effect a tight seal. The physical properties of the packer 38 are such that the packer 38 may deform and seal under manually created pressure and still resist stripping of the threads 58. The first few internal threads 60 may be slightly rounded to facilitate engagement with external threads 54.

The threaded packer 38 has a rounded nose 62 and a smooth, unthreaded portion 61 to assist the formation of a seal between lock case 40 and expansion tube second end 52. At least one driver dog 63 is provided to engage with a corresponding driver dog recess 64 within the lock case 40 to transfer the rotation of lock case 40 to the threaded packer 38.

The lock case 40 comprises a first, enlarged open end 66 forming a sealing bore. The first open end 66 is dimensioned to closely fit with the seal ring 50 on the expansion tube 36. An internal surface 68 of the lock case 40 is dimensioned to match the tapered external surface 56 on the packer 38. A second end 70 of the lock case 40 mates with the outlet pipe 30. The second end 70 is positioned to sealingly engage a butt joint 72 with an appropriate seal 74 therebetween.

A shroud 76 is formed on an external surface of the first enlarged open end 66 of the lock case 40. In the preferred embodiment, the shroud 76 extends radially outwardly from the lock case 40. A hole 78 is formed through the lock case 40 and threaded to match the threads on the locking bolt 33.

The locking bolt 33 has a circumferential groove 79 formed in an axial face 80. Once the bolt 33 is installed into the lock case 40, a combination dust cover and seal 81 may be snapped over the bolt 33 so that an internal lock ring 83 on the seal 81 fits snugly around the bolt 33 within the grove 79. The seal 81 has a cap portion 104 and an outside diameter portion 106. The outside diameter portion 106 is larger than an inside diameter of the shroud 76 so that upon installation the seal 81 "dishes" inwardly. The seal 81 may be formed from any appropriate material such as a plastic which will allow it to deform or "dish" slightly. Thus, the seal 81 prevents contaminating materials from collecting around the bolt 33 and because it cannot be removed without incurring obvious damage, it serves as a visual sign of any tampering.

Although not shown, it is to be understood that the seal 81 may have any one of several equally functional configurations. For example, the lock ring 83 may be non-continuous and still securely hold the seal 81 within the circumferential groove 79. Additionally, the lock ring 83 could be formed on an external surface of the cylindrical portion 106 to match a groove formed on an inside wall of the shroud 76 rather than the groove 79 in the bolt 33.

Figure 3:
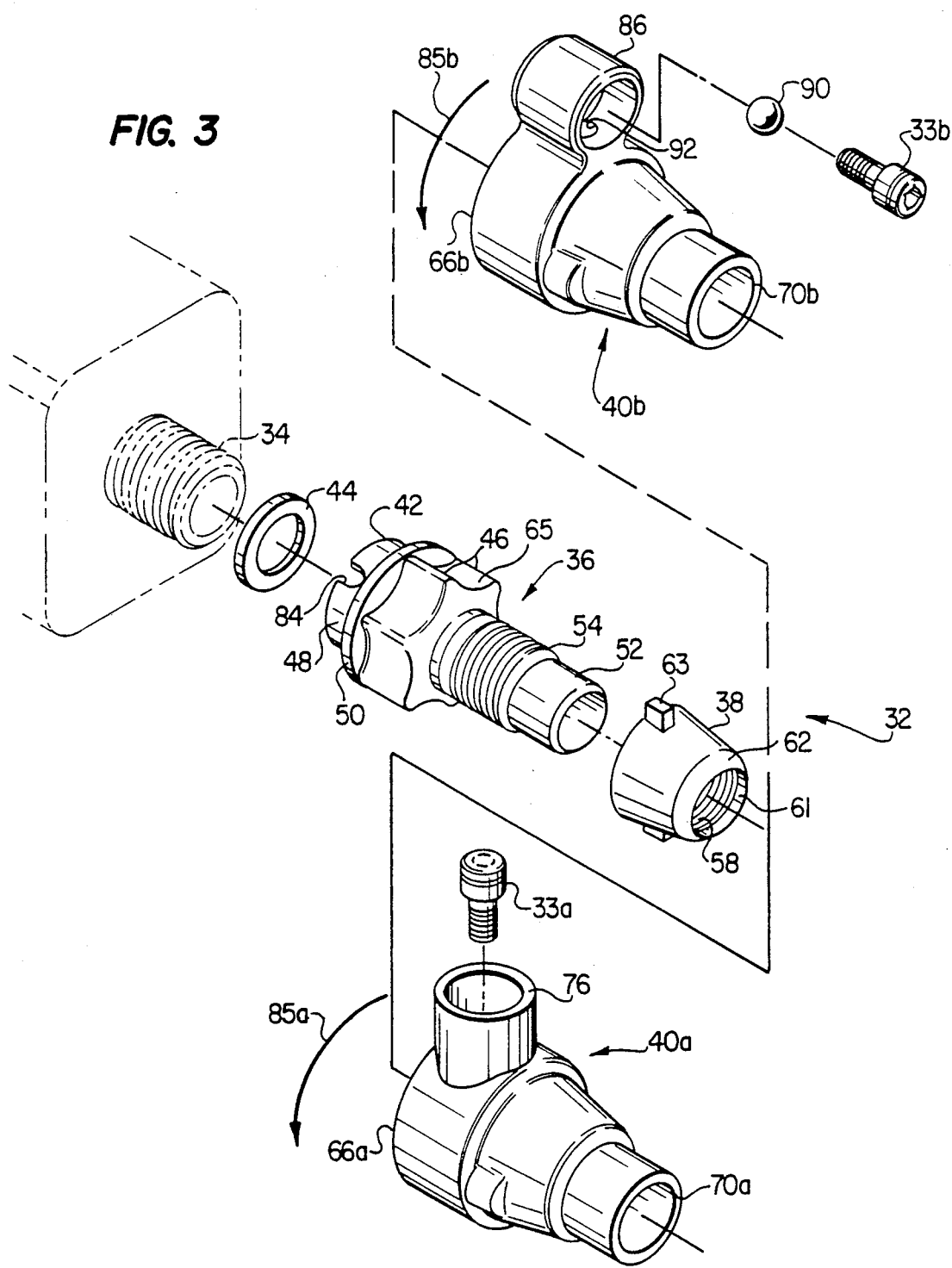
FIG. 3 is an exploded perspective of the present invention including two alternative locking arrangements.

Referring to FIG. 3, an exploded perspective view of the universal expansion connection 32 is shown with a preferred and an alternate embodiment identified by the small letters "a" and "b", respectively. In operation, the threaded packer 38 is threaded onto the external threads 54 of the expansion tube 36. The washer 44 is then inserted into the first open end 42 of the tube 36, and the tube 36 is either threaded onto or pushed over the outlet 34. If the tube 36 is internally threaded, the tube 36 is turned and properly tightened. However, if the expansion tube 36 is internally smooth bored as is preferred, a special installation tool must be used in conjunction with a notch 84 in the collar 48 of the tube 36 to mechanically couple tube 36 on the meter outlet 34, as will be subsequently described in greater detail.

The first end 66a and 66b of the lock case 40a or 40b is then positioned over the threaded packer 38 with the driver dog 63 installed within the driver dog recess 64 (not shown). The second end 70a or 70b of lock case 40a or 40b is positioned within the outlet pipe 30 with the seal 74 therebetween (neither shown). The lock case 40a or 40b is then firmly gripped and turned, as indicated by arrows 85a and 85b to unscrew the lock case 40a or 40b off the threads 54 until a seal is realized.

The lock case 40a or 40b is dimensioned so that the complete removal of the threaded packer 38 from the external threads 54 cannot occur. As the lock case 40a or 40b and the threaded packer 38 are unscrewed from the threads 54, the second end 70a or 70b of the case 40a or 40b is jammed into the seal 74 and the butt joint 72 of the outlet pipe 30. The threaded packer 38 is also forced deeper and tighter into the internal surface 68 of the lock case 40a or 40b, causing the threads 58 and the smooth unthreaded portion 61 of packer 38 to deform slightly thereby decreasing in diameter, and forming a tight seal. The rounded nose 62 and smooth, unthreaded portion 61 will be the first to seal. It is preferable that the threads 58 of threaded packer 38 and threads 54 on expansion tube 36 be constructed to allow 100% thread engagement when the connection 32 is fully installed.

Also shown in FIG. 3 is an alternate shroud 86. The shroud 86 is formed to be parallel to a central axis of the lock case 40b. The locking bolt 33b is threaded into the shroud 86, coming into contact with a ball 90, such as a metallic ball bearing, which fits within a void 92 formed through the lock case 40b. As the expansion tube 36 is rotated within the lock case 40b, the arc shaped cam 65 between locking bars 46 causes the ball 90 to rise up into shroud 86 through void 92 until it comes into contact with locking pin 33b. At this point, no further rotation is possible. Although not shown, a combination dust cover and seal is preferably installed over the bolt 33b in the shroud 86 on case 40b similarly to seal 81 in FIG. 2.

Figure 4:
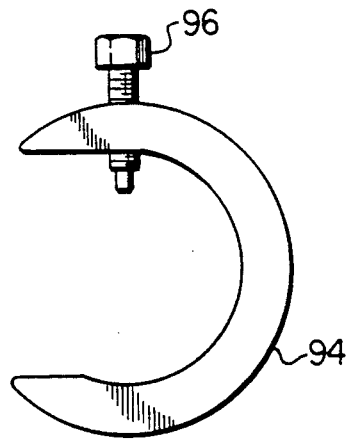
FIG. 4 is a front elevation view of a wrench used with the present invention.

Referring to FIG. 4, an installation tool 94 is illustrated. It is to be understood that the tool 94 is only one of many possible designs that could be used with the present invention. The installation tool 94 is designed to be used in conjunction with first end 42 of the expansion tube 36 when the first end 42 is smooth bored. A notch 84 (FIG. 3) is formed in the collar 48 of the expansion tube 36 for engagement with a threaded bolt 96 on the tool 94. The tool 94 is placed around the collar 48 of expansion tube 36 after the tube 36 has been placed over an outlet 34. The bolt 96 is matched with the notch 84 within the collar 48 and is threaded therein and into interference with the threads on outlet 34. By turning the bolt 96 into the threads on outlet 34, the expansion tube 36 is coupled and held in position for the rotation of the lock case 40 and the threaded packer 38 during installation and removal thereof. Alternatively and similarly, a removable set screw (not shown) through the collar 48 could be used to temporarily secure the expansion tube 36 to the meter threaded outlet 34.

Figure 5:
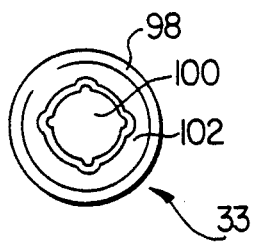
FIG. 5 is an end elevation view of a threaded locking pin used in conjunction with the present invention.

Referring to FIG. 5, an end elevation view of a threaded locking bolt 33 is illustrated. It is to be understood that the bolt 33 is only one of many possible designs that could be used with the present invention. The bolt 33 is constructed with a generally cylindrical head portion 98. The radial face 100 of the head portion 98 is fitted with a particular, nonsymmetrical, shallow, annular recessed groove 102, which acts as a lock. The annular recessed groove 102 is purposely narrow, shallow and nonsymmetrical, thereby increasing the complexity of making a bogus key wrench. The locking bolt 33 can only be installed and removed by using a special key-wrench (not shown) which fits the particular recessed groove 102 of the face 100 and is forged from a very tough material, which is not readily available to the general public.

The locking bolt 33 will preferably be installed at a specific torque and will preferably be sealed in place through the use of a thread sealant and locking compound. A combination dust cover and seal as previously described herein may be used. Because of the design of the bolt 33 and the installation torque which is augmented by the use of a locking compound, a bogus key wrench made from normally available material will fail to remove the locking bolt 33 from the lock case 40.

Figure 6:
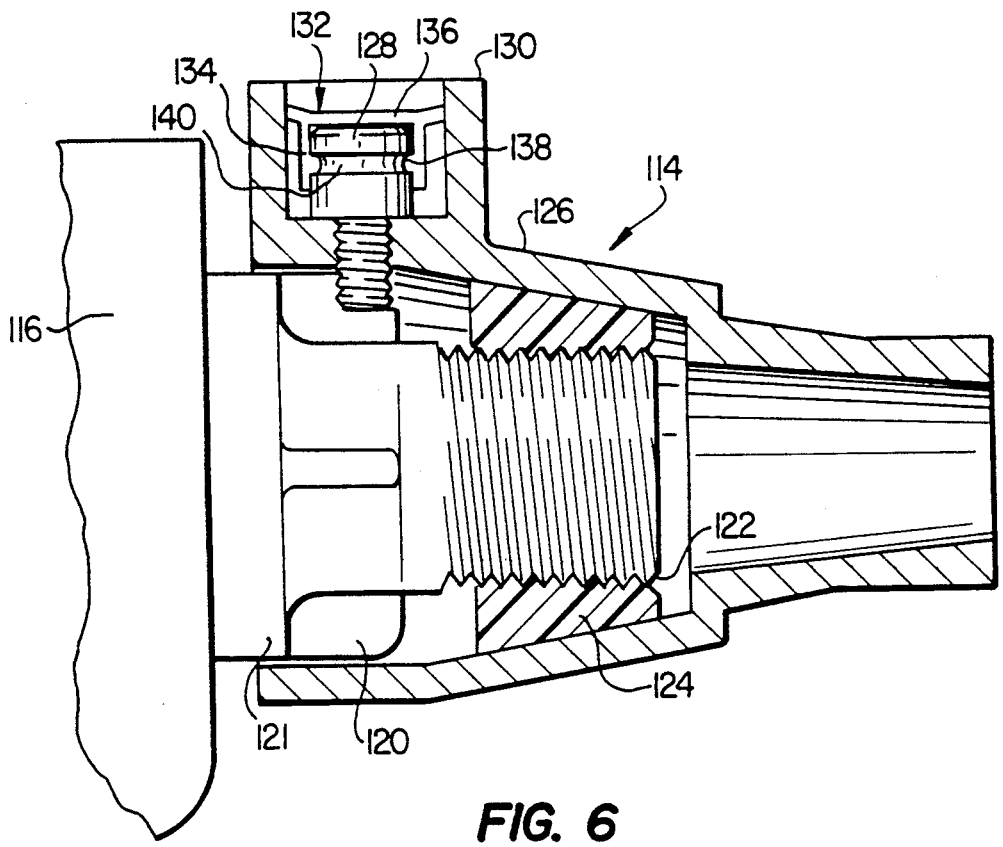
FIG. 6 is a cross-sectional view of an alternate embodiment of the present invention.

Referring to FIG. 6, an alternate embodiment of an expansion connection is generally identified by the reference numeral 114. FIG. 6 shows a water meter 116, manufactured to American Water Works Association (AWWA) standard length and having standard AWWA inlet and outlet threads 122. The meter is so constructed that locking bars 120 and sealing ring 121 are an integral part thereof and perform the same function as locking bar 46 and sealing ring 50 as shown in FIG. 3. Since the water meter overall length is governed by AWWA, the concept of a smooth extension 5 per FIG. 3 cannot be employed. Likewise, the threaded packer 124 is not fitted with rounded nose 62 and smooth sealing surface 61 per FIG. 3. The flexible threaded packer 124 will, however, upon proper installation, form a tight seal.

A threaded packer 124 and a lock case 126 are formed in generally the same manner as previously described above. The lock case 126 is secured in place with a locking bolt 128, which is positioned within a shroud 130. The locking bolt 128 is protected from outside contaminants by a combination dust cover and seal 132. The seal 132 comprises an outside diameter portion 134 and a cap portion 136. An internal lock ring 138 on the seal 132 is snuggly received by a circumferential groove 140 on the locking bolt 128. The cap portion 136 has an outside diameter greater than an inside diameter of the shroud 130 to provide an inward "dishing" effect to prevent removal without destroying the seal 132.

In operation, the packer 124 is threaded onto the meter outlet threads 122. The lock case 126 is "indexed" onto the packer 124 by matching driver dogs and driver dog recesses (not shown) on the packer 124 and the lock case 126, respectively. The lock case 126 is then rotated to unscrew the packer 124 from the meter outlet threads 122 thus forcing the threaded packer 124 to form a fluid tight seal between the meter outlet threads 122 and the mating tapered surface of case 114. As previously described above, the second end of lock case 114 is similarly forced to seal against gasket 74 per FIG. 2. In this embodiment, the sealing ring 121, locking bars 120, and outlet threads 122 are an integral part of the meter 116. There is no need to use an installation tool or a set screw as previously described above and shown in FIG. 4. The lock case 126 is locked in place with the locking bolt 128 which then may be covered with the seal 132.

Although the present invention is described with respect to a specific, preferred embodiment thereof, various changes and modifications may be suggested to one skilled in the art, and it is intended that the present invention encompass such changes and modifications as fall within the scope of the appended claims.

What is claimed is:

1. An apparatus for universally connecting and locking a first fluid carrier to a second fluid carrier, comprising:
    an expansion tube having a first open end receiving and sealingly engaging the first fluid carrier, said tube having exterior threads distal the first fluid carrier;
    a packer constructed from a single member threaded onto said exterior threads on said tube;
    a lock case having a first open end for receiving said tube and said packer and having a second end sealingly engaging the second fluid carrier, said lock case locking said tube in said first end in sealing engagement with said first fluid carrier and with the second fluid carrier in said second end such that the first fluid carrier is connected and locked to the second fluid carrier; and
    said expansion tube further including a plurality of spaced-apart locking bars positioned on an external circumferential surface of said tube between said first open end and said exterior threads, a lock member carried by said lock case for engaging said locking bars to prevent relative rotation between said expansion tube and lockcase, a seal ring abutting said locking bars distal said threads to seal against debris and reduce accessibility to said locking bars from exterior said lock case, and a reduced diameter collar extending axially from said seal ring to form said first open end.

2. The apparatus of claim 1, wherein said first open end further includes internal threads.

3. The apparatus of claim 1, wherein said collar further includes a notch therein for receiving an installation tool to prevent said expansion tube from turning during installation.

4. The apparatus of claim 1, wherein said threaded packer comprises a noncompressible flowable material.

5. The apparatus of claim 4, wherein said noncompressible flowable material comprises polyurethane.

6. The apparatus of claim 4, wherein said noncompressible flowable material comprises a thermoplastic polyester elastomer.

7. The apparatus of claim 1, wherein said packer further comprises a tapered external surface.

8. The apparatus of claim 7, wherein said lock case further comprises a tapered internal surface to match said tapered external surface of said packer.

9. An apparatus for universally connecting and locking a first fluid carrier to a second fluid carrier, comprising:
    an expansion tube having a first open end receiving and sealingly engaging the first fluid carrier, said tube having exterior threads distal the first fluid carrier;
    a packer constructed from a single member threaded onto said exterior threads on said tube, said packer including at least one external driver dog; and
    a lock case having a first end for receiving said tube and said packer sealingly engaging the second fluid carrier, said lock case locking said tube in said first end in sealing engagement with said first fluid carrier and with the second fluid carrier in said second end such that the first fluid carrier is connected and locked to the second fluid carrier.

10. The apparatus of claim 9, wherein said lock case further comprises at least one internal driver dog recess matching said driver dog such that said packer turns with said lock case.

11. An apparatus for universally connecting and locking a first fluid carrier to a second fluid carrier, comprising:
    an expansion tube having a first open end receiving and sealingly engaging the first fluid carrier, said tube having exterior threads distal the first fluid carrier;
    a packer threaded onto the exterior threads on said tube; and
    a lock case having a first end for receiving said tube and said packer and a second end sealingly engaging the second fluid carrier, said lock case locking said tube in said first end in sealing engagement with said first fluid carrier and with the second fluid carrier in said second end such that the first fluid carrier is connected and locked to the second fluid carrier, said lock case further including a shroud proximate said first end, and a threaded locking bolt housed in said shroud for locking said expansion tube.

12. The apparatus of claim 11, wherein said shroud is oriented in a radial direction on said lock case to allow said locking bolt to extend through said case into direct locking engagement with said tube.

13. The apparatus of claim 11, wherein said shroud is oriented parallel to a central axis through said lock case and further comprises indirect engaging means for locking said tube.

14. The apparatus of claim 13, wherein said indirect engaging means comprises a ball positioned in a hole formed between said shroud and said first end to allow locking engagement with said tube by tightening said bolt into said shroud.

15. The apparatus of claim 11, further comprising a combination dust cover and seal receivable within said shroud.

16. An apparatus for universally sealing and locking a water meter having an outlet to a continuation pipe, comprising:
   an externally threaded expansion tube attachable to the outlet, said tube having a generally cylindrical shape with said threads being proximate one end of said tube and having an enlarged diameter portion on another end opposite said one end;
   said enlarged diameter portion comprising a plurality of spaced apart locking bars for engagement with a lock case, a seal ring abutting said locking bars distal said threads, said ring approximately matching an internal sealing radius of said lock case, and a collar extending axially from said seal ring in dimension to receive the water meter outlet;
   a packer threaded onto said tube; and
   a lock case dimensioned to cover said tube and said packer to seal and lock the water meter and the outlet to the continuation pipe.

17. The apparatus of claim 16, wherein said collar further includes internal threads.

18. The apparatus of claim 16, wherein said collar further includes a notch for interface with an installation tool.

19. The apparatus of claim 16, wherein said packer comprises a noncompressible flowable polyurethane.

20. The apparatus of claim 16, wherein said packer further comprises a tapered outer surface.

21. The apparatus of claim 20, wherein said lock case includes a tapered internal surface matching said tapered outer surface of said packer.

22. An apparatus for universally sealing and locking a water meter having an outlet to a continuation pipe, comprising:
   an externally threaded expansion tube attachable to the outlet;
   a packer threaded onto said tube, said packer further including at least one radially extending driver dog; and
   a lock case dimensioned to cover said tube and said packer to seal and lock the water meter and the outlet to the continuation pipe, said lockcase including at least one driver dog recess to receive said driver dog.

23. An apparatus for universally sealing and locking a water meter having an outlet to a continuation pipe, comprising:
   an externally threaded expansion tube attachable to the outlet;
   a packer threaded onto said tube; and
   a lock case dimensioned to cover said tube and said packer to seal and lock the water meter and the outlet to the continuation pipe, said lock case including a first open end for receiving said tube, a reduced diameter portion adjacent to first open end for receiving the packer, a second cylindrical end for sealingly engaging the continuation pipe, and an external shroud for housing a threaded locking bolt.

24. The apparatus of claim 23, wherein said lock case is formed with a hole therethrough to allow said threaded locking bolt to engage said tube.

25. The apparatus of claim 24, wherein said locking bolt extends through said hole for direct interference with said tube.

26. The apparatus of claim 24, wherein said locking bolt contacts an indirect interference means.

27. The apparatus of claim 26, wherein said interference means comprises a ball.

28. The apparatus of claim 23, further comprising a combination dust cover and seal receivable within said shroud.

29. A method for sealing and locking a first fluid carrier to a second fluid carrier, comprising the steps of:
   sealingly engaging a first end of an expansion tube with the first fluid carrier;
   threading a packer onto a second end of said expansion tube;
   inserting said packer and said expansion tube into a lock case;
   matching at least one driver dog on said packer with at least one driver dog recess in said lock case; and
   sealingly engaging said lock case with a second fluid carrier such that said lock case and said expansion tube couple the first fluid carrier to the second fluid carrier such that a water meter cannot be removed.

30. A method for sealing and locking a first fluid carrier to a second fluid carrier, comprising the steps of:
   sealingly engaging the first end of an expansion tube with the first fluid carrier;
   threading a packer onto a second end of said expansion tube;
   inserting said packer and said expansion tube into a lock case; and
   sealingly engaging said lock case with said fluid carrier such that the lock case and said expansion tube couple the first fluid carrier to the second fluid carrier such that a water meter cannot be removed, said engaging step further including rotating said lock case and said threaded packer while preventing said tube from rotating to force said packer into sealing engagement with said lock case.

31. The method of claim 30, wherein the step of engaging further includes rotating a threaded locking bolt through said lock case into engagement with a plurality of locking bars on said expansion tube.

32. An improved water meter connector, comprising:
   an externally threaded expansion tube formed integrally with the water meter;
   a plurality of spaced-apart locking bars positioned on an external circumferential surface of said tube;
   a sealing ring interconnecting said locking bars; and
   a hollow lock case receiving said expansion tube and having an inner surface closely receiving said sealing ring for preventing external debris from entering said connector and to reduce accessibility to said connector.

33. The apparatus of claim 32, wherein said bars are engageable with said lock case for securing the meter.

34. The apparatus of claim 32, wherein said tube is threadable with a noncompressible flowable packer.

* * * * *